United States Patent [19]
Knowles et al.

[11] Patent Number: 5,905,863
[45] Date of Patent: May 18, 1999

[54] FINDING AN E-MAIL MESSAGE TO WHICH ANOTHER E-MAIL MESSAGE IS A RESPONSE

[75] Inventors: Kimberly A. Knowles, Lebanon, N.J.; David Dolan Lewis, Philadelphia, Pa.

[73] Assignee: AT&T Corp, Middletown, N.J.

[21] Appl. No.: 08/866,196

[22] Filed: May 30, 1997

Related U.S. Application Data

[60] Provisional application No. 60/019,264, Jun. 7, 1996.

[51] Int. Cl.$^6$ .................................................... G06F 17/27
[52] U.S. Cl. .................... 395/200.36; 707/513; 707/501; 345/356
[58] Field of Search ....................... 395/200.36; 345/357, 345/356, 339; 707/513, 501

[56] References Cited

U.S. PATENT DOCUMENTS

| | | | |
|---|---|---|---|
| 5,404,488 | 4/1995 | Kerrigan et al. | 711/133 |
| 5,754,939 | 5/1998 | Herz et al. | 455/4.2 |
| 5,796,633 | 8/1998 | Burgess et al. . | |
| 5,799,304 | 8/1998 | Miller | 707/7 |

OTHER PUBLICATIONS

"Hypermail 1.02," rewritten in C by Kevin Hughes at EIT, last updated Aug. 25, 1995, pp. 1–9.

K.E. Jones, "VM User's Manual," Second Edition, VM Version 5, Jun. 1991, pp. 1–32.

J. Allan, "Automatic Hypertext Link Typing," The Seventh ACM Conference on Hypertext, Washington, DC, Mar. 16–20, 1996, *Hypertext '96* Washington, DC USA, 1996, pp. 42–52.

G. Salton and C. Buckley, "Global Text Matching for Information Retrieval,"*Science*, vol. 253, Aug. 30 1991, pp. 1012–1015.

G. Salton, J. Allan and C. Buckley, "Automatic Structuring and Retrieval of Large Text Files," *Communications of the ACM*, vol. 37, No. 2, Feb. 1, 1994, pp. 97–108.

H.P. Frei and M.F. Wyle, Retrieval Algorithm Effectiveness in a Wide Area Newwork Information Filter, *Proceedings of the Annual International ACM/SIGIR Conference on Research and Development in Information Retrieval*, Chicago, Oct. 13–16, 1991, Conf. 14, Oct. 13, 1991, pp. 114–122.

D. Goldberg, D. Nichols, B.M. Oki and D. Terry, "Using Collaborative Filtering to Weave an Information Tapestry," *Communications of the ACM*, vol 35, No. 12, Dec. 1, 1992, pp. 61–70.

"Intelligent Document Analyzer for Smartmail," *IBM Technical Disclosure Bulletin*, vol 34, No. 4A, Sep. 1, 1991, p. 215.

*Primary Examiner*—Parshotam S. Lall
*Assistant Examiner*—Kenneth R. Coulter

[57] ABSTRACT

Current tools for processing e-mail and other messages do not adequately recognize and manipulate threads, i.e., conversations among two or more people carried out by exchange of messages. The present invention utilizes the textual context and characteristics of messages in order to provide a more reliable and effective way to construct message threads. In accordance with the present invention, statistical information retrieval techniques are used in conjunction with textual material obtained by "filtering" of messages to achieve a significant level of accuracy at identifying when one message is a reply to another.

63 Claims, 3 Drawing Sheets

Microfiche Appendix Included
(1 Microfiche, 76 Pages)

FINDING AN E-MAIL MESSAGE TO WHICH ANOTHER E-MAIL MESSAGE IS A RESPONSE

CROSS-REFERENCES TO RELATED APPLICATIONS

This application claims the benefit of U.S. Provisional Application No. 60/019,264, filed Jun. 7, 1996, entitled "Finding an E-mail Message to Which Another E-mail Message Is a Response."

MICROFICHE APPENDIX

A microfiche appendix has been provided which lists the source code of the programs developed to carry out the experiments described below in connection with the present invention. There is 1 microfiche, with 76 frames.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to electronic messaging and, more particularly, to a way of recognizing and manipulating threads contained in electronic messages.

BACKGROUND OF THE INVENTION

The volume of electronic messages, such as electronic mail ("e-mail") , is huge and growing. Many users receive more messages than they can handle, which has sparked interest in better message handling software. Almost all e-mail readers now support separating messages into folders, and often allow rules to be defined to do this automatically. Tools for prioritizing and searching messages are also becoming available.

A problem with most such approaches is that they process each message individually. Many messages are parts of larger conversations, or threads. A thread is a conversation among two or more participants carried out by exchange of messages. Treating messages outside of this context may lead to undesirable results. For instance, a system that sorts messages into folders based on their content is unlikely to be 100% accurate. The effectiveness of content-based text categorization systems varies considerably among categories, and accuracies over 95% are rarely reported. This means that threads having as few as 20 component messages will almost always be broken up and distributed into multiple folders by such a system, making it difficult for a reader to follow the conversational structure.

On the other hand, a mail reading interface that understood threads could save users considerable effort. For instance, some programs for reading Usenet news allow users to delete an entire thread at once, greatly reducing the number of messages the user must inspect.

Messaging systems that are explicitly oriented to group discussion, e.g., the Usenet network and other bulletin board systems, provide the most support for threading. For instance, the reply command in most Usenet news posting programs inserts into a reply or child message two forms of information about the relationship between it and its parent message (the message it is a reply to). First, the chain of unique message identifiers in the REFERENCES: field of the parent is copied into the REFERENCES: field of the child, with the unique identifier of the parent added. Second, the SUBJECT: line of the parent is copied into the SUBJECT: line of the child, typically prefixed by Re:. Usenet news readers providing a threaded display use the structural links from the REFERENCES: field, while others organize a threaded display around SUBJECT: lines which are identical or have identical prefixes.

Conversations, including group discussions, can also be carried out over electronic mail systems. The ability to send to and reply to groups of people, as well as the use of centralized mail "reflectors" and mailing list management software, can informally support multiple large scale discussions. As with bulletin board systems, replying to an e-mail message often inserts structural information into the reply. For Internet-based mail systems, the reply command may copy the MESSAGE-ID: field or other identifying information from the parent, into the IN-REPLY-TO: field of the child. As in Usenet messages, the SUBJECT: line is typically copied to the SUBJECT: field, preceded by Re:.

Some mail clients provide threaded displays, though this is less common than for bulletin board systems. For instance, the VM mail reader (available at ftp.uu.net in networking/mail/vm directory) allows grouping of messages by one of several criteria, including having the same subject line text, the same author, or the same recipient. The mail archiving program hypermail (see http://www.eit.com/software/hypermail.html) marks up archives of e-mail with a variety of links, including threading information. It attempts first to find a message id in the IN-REPLY-TO: field and match it to a known message. Failing that it looks for a matching date string in the IN-REPLY-TO: field, and finally tries for a match on the SUBJECT: line, after removing one Re: tag.

However, the error rate of each of the above approaches is considerable. While the REFERENCES: field is in theory required for replies to Usenet messages, threading is hampered by clients that delete portions of the REFERENCES: chain due to limitations on field length. In Internet electronic mail, the use of MESSAGE-ID: and IN-REPLY-TO: fields are optional and their format and nature is only loosely constrained when they are present. SUBJECT: lines for both Usenet messages and Internet mail are allowed to contain arbitrary text, clients are inconsistent in their use of Re: tags, and manual editing of SUBJECT: lines further confuses the issue. Furthermore, current approaches to threading are to some extent misconceived, as they rely upon rapidly changing conventions in software communication.

While user clients typically insert in messages structural information useful for recovering threads, inconsistencies between clients, loose standards, creative user behavior, and the subjective nature of conversation make current threading systems only partially successful, and the situation is unlikely to change.

One approach to dealing with the above situation is to try to force clients to follow tighter standards for specifying threads. However, such an approach does not appear practical in light of the increasing diversity of clients and the growing interconnection of only partially compatible messaging systems. Tighter standards also do not help in recovering thread structure from archived messages, since deletion of fields such as IN-REPLY-TO: by archiving and digestifying programs is common.

It is also not clear that threads should be identified with trees of reply links. The reply command is often used to avoid retyping a mail address, rather than to continue a conversation. Further, users will disagree about what is on-topic in a thread, and off-topic responses can easily spawn subdiscussions. Conversely, on-topic contributors to a discussion may simply send a message rather than using the reply command.

This suggests that the links desired for display in a threading interface, and which result in structures to be processed as a unit, are actually not objectively defined "pattern-matching" or "structural" links. The link desired to be captured is that of a response in an ongoing discourse. The fact that users are able to participate in online discussions, despite the inadequacies of current threading software, suggests that most messages contain the contextual information to understand their place in an ongoing conversation. Thus it is at least possible that an automated system will be able to make use of this information as well to make this conversational structure explicit as a thread.

The role of cohesion or linking between the parts of a dialogue has been recognized. Language provides a variety of mechanisms for achieving this cohesion. One such mechanism is lexical cohesion and in particular lexical repetition, that is, the repeating of words in linked parts of a discourse.

The phenomenon of lexical repetition suggests that the similarity of the vocabulary between two messages should be a powerful clue to whether a response relationship exists between them. Measuring the similarity of vocabulary between texts is, of course, a widely used strategy for finding texts with similar topic to a query. Indeed, similarity-based methods have been used to construct hypertexts linking documents or passages of documents on the basis of topic similarity.

Attempts have also been made to go beyond unlabeled linking to use similarity matching in detecting discourse relations. Hearst's TextTiling algorithm (see M. A. Hearst, "Multi-paragraph Segmentation of Expository Text," 32nd Annual Meeting of the Association for Computational Linguistics at Pp. 9–16, Las Cruces, N.M. Jun. 27–30, 1994) uses vector space similarity to decompose a text into topically coherent segments. Also used is the graph structure of a network of raw similarity links to infer meta-links corresponding to discourse relations such as comparison and summarization (see J. Allan, "Automatic Hypertext Link Typing," Proceedings of Hypertext '96, 1996). These lines of evidence suggest text similarity could be a clue to the existence of a response relation between messages as well.

What is desired is a way to utilize robust conventions in human communication in place of, or in addition to, software conventions in order to produce an effective message threading system.

SUMMARY OF THE INVENTION

An object of the present invention is to utilize the textual context and characteristics of messages to provide a more reliable and effective way to construct message threads. In accordance with the present invention, statistical information retrieval techniques are used in conjunction with textual material obtained by "filtering" of messages to achieve a significant level of accuracy at identifying when one message is a reply to another.

DETAILED DESCRIPTION

Figure 1:
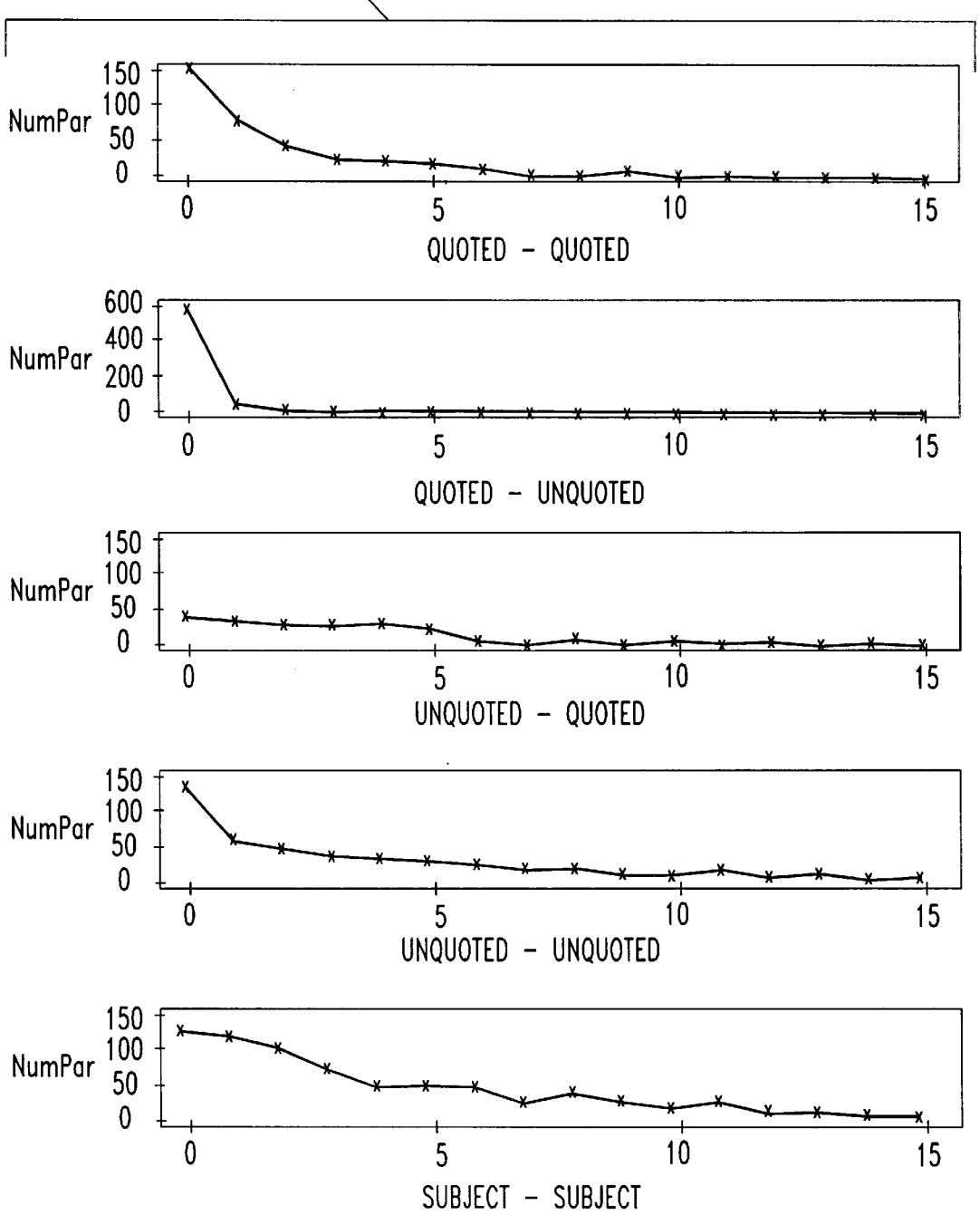
FIG. 1 shows the results of experimentation for a matching strategy used in an embodiment of the present invention.

Threading of electronic messages should be treated as a language processing task. The present invention utilizes textual context and characteristics of messages in order to provide a more reliable and effective way to construct message threads. Preliminary experiments show that a significant level of threading effectiveness can be achieved by applying standard text matching methods from information retrieval techniques to the textual portions of messages. In accordance with the present invention, statistical information retrieval techniques are used in conjunction with textual material obtained by "filtering" of messages to achieve a significant level of accuracy at identifying when one message is a reply to another. A preferred embodiment of the present invention will now be described with reference to the experiments described below. The experiments are meant to be illustrative of the process of the present invention and are not intended to be limiting.

Experiments

The goal in experimentation was to test the ability of various linguistic clues to indicate whether one message was a response to another. Three types of textual material from messages were investigated: (1) the SUBJECT: line; (2) quoted material in the message; and (3) the (unquoted) text of the message itself. The results of the experiments conducted show that statistical information retrieval techniques can achieve a significant level of accuracy at identifying when one message is a reply to another.

Text from the SUBJECT: line is a good clue that a message belongs to a particular thread, though it may not directly indicate which message in the thread is being replied to. Quoting of material from the parent message, particularly quotes of several lines, is a much stronger form of context. Salton and Buckley in an article entitled "Global Text Matching for Information Retrieval," Science, 253:1012–11015 (August, 1991), showed that text matching on a collection of Usenet messages which included substantial quoted material was highly effective at retrieving related messages, under a definition of relatedness that subsumed the response relationship of interest.

Further, the actual text of the reply can be expected, based on the coherence phenomena described earlier, to repeat words from the parent message. Since new material will be present as well, it is expected this to be a somewhat weaker clue than the SUBJECT: line and quoted text.

a. Data Set and Preparation

A corpus of 2435 messages posted to the www-talk mailing list during the period February 1994 through July 1994 were obtained from the archives at URL http://www.w3.org/hypertext/WWW/Archive/www-talk. A total of 941 of these messages had an IN-REPLY-TO: field containing a unique identifier from the MESSAGE-ID: field of another message in the corpus. While it is suggested herein that IN-REPLY-TO: links will not always correspond to the discourse response links of interest, they provide a reasonable initial test of the ability of text matching to find connections that are response-like. Therefore, these 941 child-parent pairs were used as ground truth against which methods for finding parent messages were tested.

Simple message filters were written to extract the three types of textual material (referred to above) from each message: (1) the text of the SUBJECT: field; (2) unquoted text from the message body; and (3) quoted text from the message body. This resulted in three collections of 2435 document representatives, one for each type of textual material. Some messages had empty document representatives in some of the databases (for instance, a message might have no quoted material) and so could not be retrieved from that database. These messages were used as "target" messages for the matching strategies described herein. Target messages represented the potential parent messages matched against a given "query" (child) message chosen from the database. The "best" match of the target messages (excluding the query message) for a given query message represents a potential parent message.

Each of the three collections was indexed using Version 11.0 of the SMART experimental text retrieval system, obtained Jun. 13, 1995 from directory pub/smart at ftp.cs.cornell.edu. The SMART text retrieval system uses statistical information retrieval techniques to rank target messages based using the cosine similarity formula and a variant of tfxidf weighting. Using the SMART system, target messages were represented as vectors of numeric weights:

$$<w_{i1}, w_{i2}, \ldots w_{ik}, \ldots, w_{it}>$$

where $$w_{ik} = \frac{f_{ik}}{\sqrt{\sum_{j=1}^{t} f_{ij}^2}}$$

and $f_{ik}$ is the number of times word k appears in message I. Query messages were similarly represented as vectors:

$$<q_1, q_2, \ldots q_k, \ldots, q_t>$$

where $$q_k = \frac{f_k \times \log(N/n_k)}{\sqrt{\sum_{j=1}^{t} (f_j \times \log(N/n_j))^2}}$$

Here $f_k$ is the number of times the word occurs in the query message, N is the number of messages in the database, and $n_k$ is the number of messages containing word k. SMART scores each target message I as $$\sum_{j=1}^{t} q_j w_{ij}$$

b. Processing

Five text matching strategies were tested in the experiments for their ability to retrieve the parent of a message, given text from the child message. For each strategy, all 941 document representatives of identified child messages were run as queries against one of the three databases of 2435 document representatives using the SMART system. This produced a ranking of all 2435 target (that is, potential parent) messages for each query message. Messages which did not have any words in common with the query were not retrieved. They were assigned random ranks lower than that of any retrieved message. Documents were ranked by the score assigned by the SMART system processing. The code developed for carrying out the processing, message filtering and matching (with the exception of the SMART program which, as noted, was obtained from a publicly-available source) is included in the microfiche appendix, which is filed herewith and expressly incorporated by reference herein.

Each strategy was a choice of what text from a child should be used as a query (i.e., what type of message filter to use for a child message), and what text from target messages (i.e., what type of message filter) should be used to represent them in the database. The five combinations explored were:

| Queries | Targets |
|---|---|
| Subject text | Subject text |
| Unquoted text | Unquoted text |
| Unquoted text | Quoted text |
| Quoted text | Unquoted text |
| Quoted text | Quoted text | c. Experimental results

FIG. 1 displays the distribution of ranks of the 941 parent documents with respect to each of the five forms of text matching. The value for rank 0 is the number of times a child retrieved its parent as the first document in the ranking, rank 1 indicates how often the parent was second ir the ranking, and so on. In computing the rank of the parent, the child document (which was itself present in the database, though not necessarily in the same form as was used in querying) was removed from the ranking, so that the ranks run from 0 to 2433 instead of 0 to 2434.

Table 1 below shows the number of times the parent was retrieved at rank 0, ranks 0 to 4, and ranks 0 to 9 for each of the search strategies used in the experimentation, over 941 trials. Comparison of this is made to the values that would be expected if the parent appeared at a random rank between 0 and 2433.

TABLE 1

| | Parents retrieved for each search strategy | | | | | |
|---|---|---|---|---|---|---|
| Ranks | Random | Subj-Subj | Unquot-Unquot | Unquot-Quot | Quot-Unquot | Quot-Quot |
| 0 | 0.39 | 119 | 131 | 40 | 666 | 150 |
| 0–4 | 1.93 | 446 | 303 | 161 | 745 | 319 |
| 0–9 | 3.87 | 639 | 418 | 210 | 759 | 368 |

Discussion

As expected, using the quoted portion of a message as a query (i.e., child message filter extracts quoted text portion) and matching against the unquoted portions of target messages (i.e., target message filter extracts unquoted text) was the most effective strategy, of the five strategies tried, for finding a parent message. As shown in Table 1, the parent was the highest ranked message in 666 out of 941 trials or 71% of the time (for the quoted query—unquoted target strategy). Put another way, a system that simply assumed the highest ranked message under this matching strategy was the parent would, on average, have 0.71 recall (i.e., retrieval of 71% of the items relevant to the query message) and 0.71 precision (i.e., 71% of the retrieved items are relevant to the query message) at finding parent messages. Of course, these results are for messages that are known to have a parent message. An operational system would need not only to distinguish among potential parents, but also to detect whether or not the message has a parent at all. One way of accomplishing this is to establish a threshold—which may be preset or specified by a user—against which the ranking or similarity scores for the child and potential parent messages would be measured. If the highest ranking or similarity score falls below the threshold, then it would be determined that there is no "match", i.e., no true parent message for that child message.

These results can be roughly compared with the 0.90 recall and 0.72 precision in Salton and Buckley's experiments with Usenet messages containing quoted material. However, Salton and Buckley were attempting to find related messages, not just parent messages, and defined all messages with the same SUBJECT: line as being related. The task undertaken by Salton and Buckley is a simpler task than finding the single parent of a message.

Referring again to FIG. 1, it is apparent that the other strategies tried were not as effective as matching quoted text against unquoted targets, though all were far better than random at finding parent messages. Even matching unquoted text queries against quoted text targets, which preferentially retrieves the children of a message, returns a nontrivial number of parents based on general content similarity. Similarly, quoted queries against quoted targets mostly should find siblings of a message, but gets some parents due to nested quotations that persist to the child.

How fast the number of parents gained drops off with increasing rank also depends on the matching strategy. As shown in FIG. 1, the smoothest decay comes from matching unquoted material against unquoted material (the fourth curve in FIG. 1). This picks up parents based on a general similarity of content rather than repetition of actual text from the parent. The relatively smooth gradation of content similarity which shows up in typical text retrieval systems also shows up here. In contrast, the curve for quoted queries vs. unquoted messages drops off extremely sharply. In most cases only the single parent messages will have a large block of unquoted text similar to the quoted text of the child. The curve for subject vs. subject (the fifth curve in FIG. 1) drops sharply at the beginning, after the exhausting of those cases where there are nearly exact matches between the SUBJECT: line of the query and a few documents with the same SUBJECT: line. Later the curve is more gradual reflecting cases where the subject line is common to many messages, or the match is on only a subset of the words.

Figure 2:
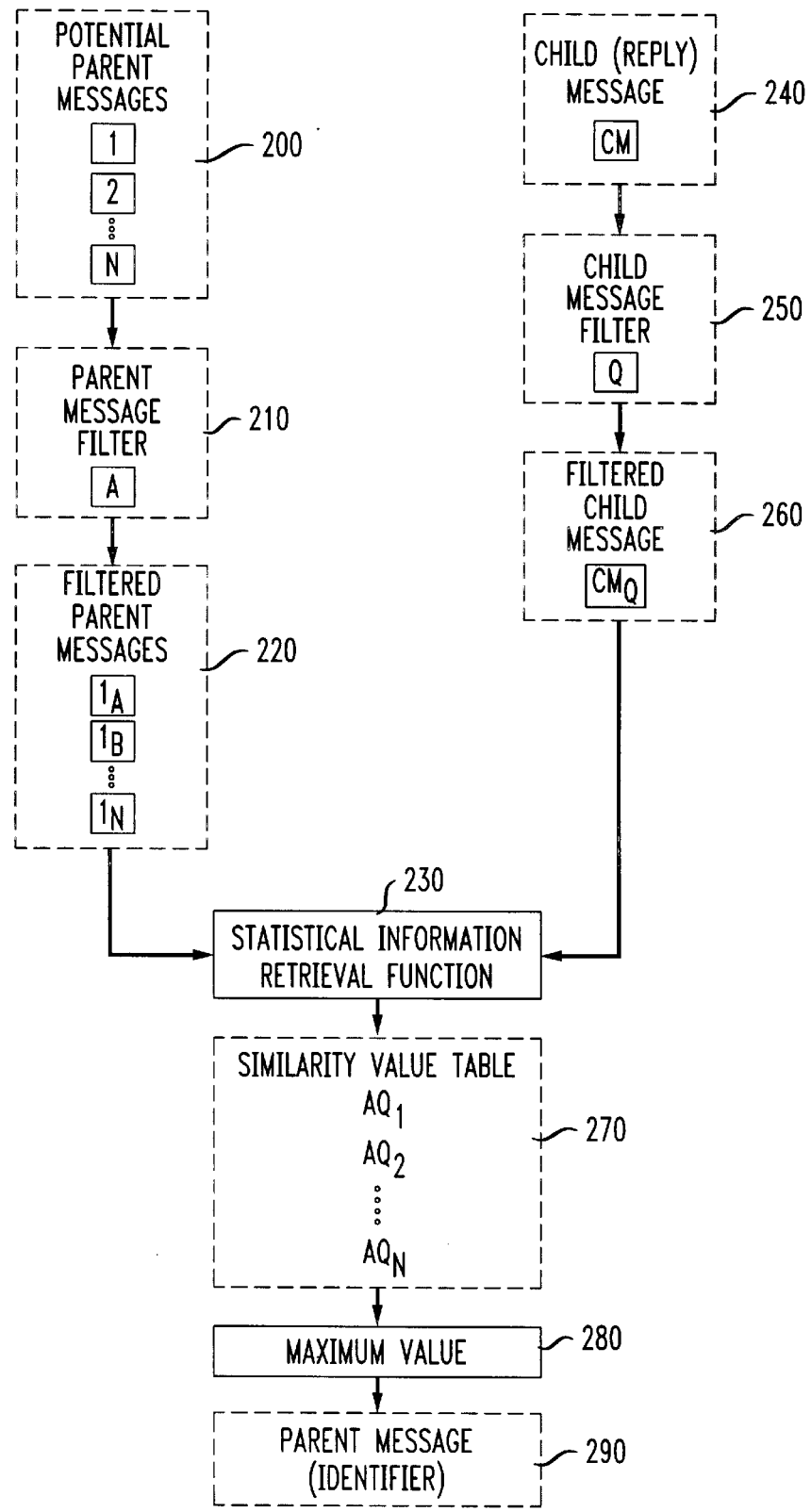
FIG. 2 contains a diagram showing an embodiment of the present invention.

The diagram in FIG. 2 shows the flow of message processing in accordance with the present invention. At 200 is a set of N target messages (denoted 1, 2, . . . , N), any of which may be a parent message to be determined. Each target (potential parent) message at 200 is filtered through a parent message filter A at 210. As seen from the experiments described above, parent message filter A may extract subject text, unquoted text, or quoted text from each message. The result of the message filtering operation is a set of filtered target (potential parent) messages (denoted $1_A, 2_A, \ldots, N_A$) at 220. Preferably, based upon the above test results, message filter A at 210 extracts unquoted text from each potential parent, and the set of unquoted text messages for potential parents is at 220.

Continuing, the filtered potential parent messages ($1_A, 2_A, \ldots, N_A$) at 220 are then passed along to a Statistical Information Retrieval Function at 230. Statistical Information Retrieval Function 230 can be the SMART system described above or an equivalent statistically-based retrieval function.

The child, or reply, message CM at 240 is also processed using a message filter Q at 250. As discussed above, the child message filter may extract subject text, unquoted text, or quoted text from the child message, producing a filtered child message $CM_Q$ at 260. Preferably, based upon the experiments described above, the child message filter at 250 extracts quoted text from the child message CM at 240, producing child quoted text at 260.

The filtered child message $CM_Q$ is then passed to the Statistical Information Retrieval Function at 230, along with filtered parent messages ($1_A, 2_A, \ldots, N_A$). The Statistical Information Retrieval Function processes these message components to provide a similarity value table at 270, which represents values (denoted $AQ_1, AQ_2, \ldots, AQ_N$) each of which is a measure of how likely it is that the corresponding message (1, 2, . . . , N) is the parent for the child message CM.

To determine the most likely parent message, the similarity value table at 270 is processed by a maximum value function at 280 from which the maximum value can be determined. The position in the table of the maximum value is a pointer or identifier at 290 that can be used to retrieve the corresponding target message which has been selected as the most likely parent message. This message can now be presented to the user along with the child message in a variety of formats, or simply retained for further processing to produce a thread. Alternatively, a list of potential message pairings—with or without selecting which one is the actual parent—may be presented to the user.

As mentioned above, an alternative step may include establishing a threshold against which the ranking or similarity scores for the child and potential parent messages are measured, and if none of the rankings or similarity scores exceed the threshold, then it would be determined that there is no "match", i.e., no true parent message for that child message.

Generating a thread may be accomplished by iteratively applying the method of the present invention as described above. Starting with a perceived child message, a likely parent message is determined using the method. That parent message is then substituted as a new "child" message and its parent (i.e., the grandparent of the original child message) is determined using the same method. Similarly, the grandparent message can then be substituted as yet another "child" message to determine its parent and so forth, so that ultimately a thread of messages having parent-child relationship between successive messages may be obtained.

Another way to generate a thread of messages is to process all messages as child messages against all other messages as potential parent messages (which, in fact, is the technique utilized during experimentation). For each child message, its parent is determined as described above using a statistical information retrieval function and computing similarity values. Threads can be determined by linking up successive child-parent pairs. Linking of successive child-parent pairs may be done by, for example, finding a child message (denote as "B") having a parent message (denote as "A") wherein child message "B" is itself a parent message for another child message (denote as "C") ; that is, message "A" is the parent of "B" and the grandparent of "C." Thus, the link of messages would be "A"-"B"-"C", and so on until all messages in the thread are accounted for.

An alternative to the embodiment of the present invention described above may be used to obtain a likely child message given a parent message. The basic process using message filters is the same for the alternative embodiment. The differences in the process are the filters used. For example, in the experiments described above, the best results in determining a parent message given a child message were obtained by using a quoted text filter for the child and an unquoted filter for each of the potential parent messages. Starting with a given parent message, then, the process would involve the use of an unquoted filter on the parent message and a quoted filter for each of the remaining messages (the potential child messages). Once the messages are filtered, the processing essentially takes place as described above.

It is readily apparent that one way of utilizing the present invention is with batch processing of messages such as, e.g., would be done in connection with message archiving. Another way of utilizing the method of the present invention, however, is in the processing of incoming messages as they arrive, rather than waiting for a batch to accumulate. For example, when a new message arrives, the method of the present invention could be applied to identify a parent message from the messages that have previously arrived. In addition, in the event that the messages are received out of order, the new message could be checked against the other messages (in accordance with the method described above for locating a child message from a potential parent) in order to determine a child message for the newly received message.

A variety of improvements in the basic processing scheme described above are possible. By improving processing of document text, as well as making use of additional evidence, it is believed that the above results can be greatly improved. The improvements, each of which might be viewed as a message "filter," are as follows.

(1) Better Text Representation. The above-described experiments ignored the order of words when matching query messages against potential parents. This is sensible for detecting similarity of topic, as is the goal in matching unquoted text against unquoted text. A quotation in a child message, however, is likely to repeat a long sequence of words from the parent. Indexing, matching, and term weighting based on multi-word phrases or entire lines should greatly reduce the number and strength of spurious matches. Since header material (FROM: lines, etc.) can appear in quotes as well, matching should be allowed on this material as well.

(2) Nested Quotation. Multiple levels of quotation are common in electronic messaging, and are indicated by concatenated prefixes. For instance, if textual material is prefixed by ">>>", it would be expected that the parent message has the material prefixed by ">>", or perhaps by ">", but probably not by nothing and certainly not by "|" or "*". Concatenated Re: tags appear in SUBJECT: lines, but should be statistically characterized, since their use by mailers is erratic.

(3) Time. Most replies to a message occur within a window of a few days after the message is posted. A simple statistical model, perhaps similar to those used in analyzing citation patterns, can be used to take this tendency into account.

(4) Recognizing Other Message Relationships. Duplicated, bounced, reposted, continued, and revised messages have strong textual similarity to other messages. The experimental data showed cases where they were falsely construed as replies. If treated simply as nonreplies they are likely to distort statistical models distinguishing replies from nonreplies. A better approach is to model these other message relationships as well, both to distinguish them from response relationships and to provide additional useful links between messages. For instance, a mail reader might display a revised message while backgrounding the original.

(5) Authorship Information. Replies often refer to the author of the parent message, either in an automatically produced fashion (such as):

lewis@research.att.com (David L. Lewis) writes:
>I'd really like a threading email reader.

or via a manually written salutation (e.g., Dear Susan). These may be matched against header information of messages and manually or automatically produced signatures.

(6) Cue Phrases. In responses which do not directly quote the parent message, the author will often use linguistic cues to indicate the parent message, e.g. I really like the suggestion that. . . or Your argument is . . . Considerable research which has been done on distinguishing what relationship a particular cue phrase is indicating can be applied.

(7) Message Categorization. Certain types of messages such as calls for papers and job ads are unlikely to be replies to other messages and/or are unlikely to be replied to publicly. Known text categorization methods can detect these and provide evidence against the presence of response links.

(8) Detection of Siblings. A message without a clear connection to its parent may be similar to another child of the same parent, which does have a clear like. For instance, two people may post similar responses objecting to an error in the parent message, but only one uses the reply command.

All of the above improvements are, in effect, clues that provide evidence toward the presence or absence of response links, but in all cases this evidence is uncertain. A planned strategy is to implement the clues so as to reduce their uncertainty as much is as reasonable, but then to rely on machine learning methods known to those skilled in the art to combine these multiple uncertain clues into a decision procedure. This approach to complex information retrieval problems allows the system implementer to focus on the relatively clean task of building feature detectors, while letting a learning algorithm use training data to balance the uncertain relationship of those features to the property of interest. (Two articles provide good examples of this strategy: B. Croft, J. Callan & J. Broglio, "Trec-2 routing and Ad-hoc Retrieval Evaluation Using the Inquery System," in The Second Text Retrieval Conference (D. K. Harman, ed., Gaithersburg, Md., March 1994, U.S. Dept. of Commerce, National Institute of Standards and Technology (NIST) Special Publication 500-215) pp. 75–83; and E. Spertus, "Smokey: Automatic Flame Recognition," Manuscript, Computer Science Department, Massachusetts Institute of Technology, 1996, submitted to ACM SIGIR '96.) In addition, this approach allows the system to be tailored to user preferences as expressed, for instance, through their overriding of system decisions. This is desirable, since the presence of a response link is to some degrees subjective.

Each of the above-referenced improvements may be utilized as message filters alone or in combinations with one another and with the "subject text," "quoted text" and "unquoted text" message filters that were the subject of the experiments described herein. Accordingly, an embodiment of the present invention may be obtained as a generalization of the embodiment reflected in FIG. 2 described above. With reference to the diagram in FIG. 3, the flow of message processing for the more general embodiment of the present invention will now be described.

Figure 3:
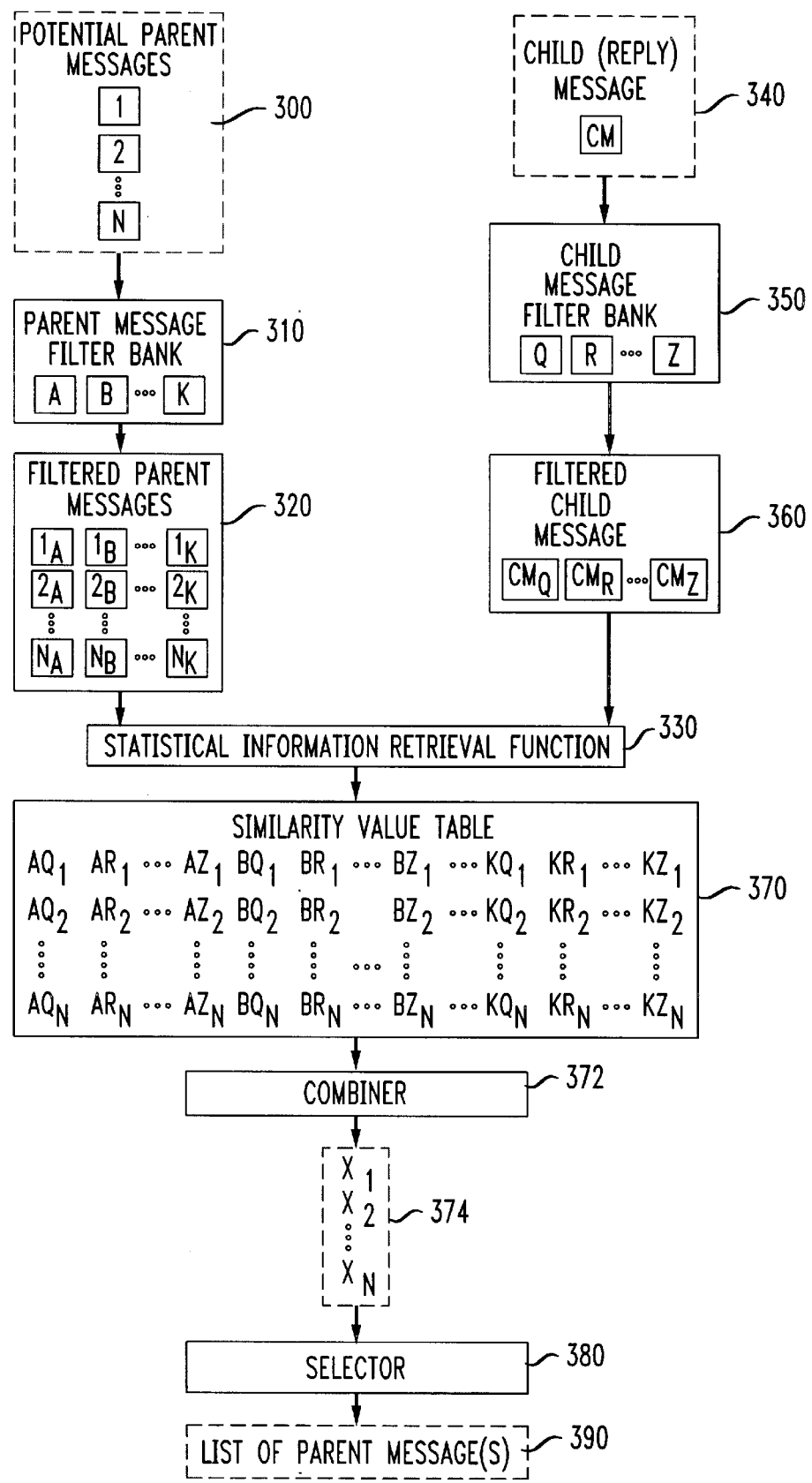
FIG. 3 contains a diagram showing a more generalized embodiment of the present invention.

As shown in FIG. 3, at 300 is a set of N target messages (denoted 1, 2, . . . , N), any of which may be a parent message to be determined. Each target (potential parent) message at 300 is filtered through a parent message filter bank (which may be one or more message filters). The parent message filter bank is shown at 310 in FIG. 3 as a set of one or more message filters denoted by A, B, . . . , K, giving a parent message filter bank of length K. Parent message filters A through K may extract subject text, unquoted text, or quoted text from each message, or they may implement one or more of the "improvements" in message analysis described above (such as, e.g., extracting nested quotations, time information, or cue phrases). The result of the filtering operation is a set of N filtered target (potential parent) message vectors (denoted $1_A, 1_B, \ldots, 1_K, 2_A, 2_B, \ldots, 2_K, \ldots, N_A, N_B, \ldots, N_K$) at 320, where each filtered parent message is a vector consisting of the K filtered representations of the message, i.e., each element of the vector is the result of one of the K filtering operations (e.g., filtered target message 1 is denoted as vector $1_A, 1_B, \ldots, 1_K$, where $1_A$ represents the result of processing target message 1 through message filter A, etc.). These filtered potential parent messages at 320 are then passed along to Statistical Information Retrieval Function at 330, which may be the SMART system described above or an equivalent statistically--based retrieval function.

The child, or reply, message CM at 340 is also processed using a message filter bank (which may be one or more message filters). In FIG. 3, the child message filter bank is shown at 350 as a set of message filters denoted as Q, R, . . . , Z, giving a child message filter bank of length Z–Q+1. The child message filter bank may contain one or more of the same type of potential message filters described above for the parent message filter bank. The child message filter bank 30 produces a filtered child message vector (denoted $CM_Q, CM_R, \ldots, CM_Z$) containing Z–Q+1 filtered representations of the message at 360.

The filtered child message vector ($CM_{Q, CMR}, \ldots, CM_Z$) is then passed to the Statistical Information Retrieval Function at 330, along with the set of filtered parent message vectors ($1_A, 1_B, \ldots, 1_K, 2_A, 2_B, \ldots, 2_K, \ldots, N_A, N_B, \ldots, N_K$). The Statistical Information Retrieval Function processes these message components to provide a similarity value table at 370, with values (denoted $AQ_1, AQ_2, \ldots, AQ_N, KZ_1, KZ_2, \ldots, KZ_N$) representative of the similarity between potential parent and child message components. It may be preferable to combine the columns of values in the similarity value table of 370 using a combiner function at 372 to provide a single tuple of values at 374, each element of which is a measure of how likely it is that the corresponding message (1, 2, . . . , N) is the parent for the child message CM. As discussed above, the combiner function may be a decision procedure based upon machine learning methods. To determine the most likely parent message, the tuple of values at 374 is processed by a selector function at 380 from which an identifier for the most likely parent message can be determined at 390. For example, if the selector function is the maximum value function described above with reference to FIG. 2, the position of the maximum value in the tuple of values is a pointer or identifier at 390 that can be used to retrieve the corresponding target message which has been selected as the most likely parent message. The selected message can now be presented to the user along with the child message in a variety of formats, or simply retained for further processing to produce a thread.

Those skilled in the art will recognize that in the latter-described embodiment of present invention, each of the parent and child messages filter banks may consist of a single message filter or multiple message filters. Those skilled in the art will further appreciate that the present invention may be implemented in any one of a number of known ways. For example, the present invention may be implemented by integrating or combining the techniques of the present invention with an e-mail reader or browser software program. Such a program may be client-based (i.e., found locally within an individual's personal computer) or server based (i.e., found in a computer or gateway remote from the individual reader). As another example, the present invention could be implemented as part of a client-based or server-based message archival software program. The advantages of the present invention do not depend upon the particular mode of operation (i.e., server or client) of a computer or processor through which the techniques herein described are implemented. It will be clear to those skilled in the art that the location of the messages that may be processed in accordance with the invention described herein need not be stored in the same location as the program utilized for carrying out such processing. Indeed, messages may be downloaded to a client station or to a message server from a remote location, such as, e.g., a message database accessible over the Internet or accessible over a corporate intranet.

In summary, instead of attempting to solve the email threading problem by forcing more consistency in the use of structural links by client software, the present invention involves an approach to threading that makes use of a range of individually uncertain, but cumulatively compelling clues as to what is going on in a conversation.

What has been described is merely illustrative of the application of the principles of the present invention. Other arrangements and methods can be implemented by those skilled in the art without departing from the spirit and scope of the present invention.

What is claimed is:

1. A method of determining from a plurality of messages a second message that is related to a first message, comprising the steps of:

a. generating a filtered first message vector by filtering the first message using a first message filter bank, said first message filter bank comprising at least one message filter;

b. generating a set of filtered second message vectors by filtering each of the plurality of messages using a second message filter bank, said second message filter bank comprising at least one message filter;

c. determining for each of the set of filtered second message vectors the degree of match between the filtered first message vector and the filtered second message vector; and d. determining from each of the degrees of match which one of the plurality of messages is the second message.

2. The method according to claim 1, wherein the relationship of the second message to the first message is parent to child;

wherein the first message filter bank comprises a message filter that extracts a quoted portion of the message being filtered; and wherein the second message filter bank comprises a message filter that extracts an unquoted portion of the message being filtered.

3. The method according to claim 1, wherein the relationship of the second message to the first message is child to parent;

wherein the first message filter bank comprises a message filter that extracts an unquoted portion of the message being filtered; and wherein the second message filter bank comprises a message filter that extracts a quoted portion of the message being filtered.

4. The method according to claim 1, wherein the step of determining the degree of match between the filtered first message vector and the filtered second message vector comprises use of a statistical information retrieval function.

5. The method according to claim 1, wherein the step of determining from each of the degrees of match which one of the plurality of messages is the second message comprises determining which one of each of the degrees of match is the maximum value and selecting the message corresponding to the determined maximum value.

6. The method according to claim 4, wherein the step of determining the degree of match between the filtered first message vector and the filtered second message vectors further comprises combining a set of values resulting from the statistical information retrieval function to form a single value representative of the degree of match.

7. The method according to claim 6, wherein the step of determining from each of the degrees of match which one of the plurality of messages is the second message comprises determining which element of the tuple of values representative of each of the degrees of match is the maximum value, and selecting the message corresponding to the determined maximum value.

8. The method according to claim 1, further comprising the step of if the first message is contained in the plurality of messages, removing the first message from the plurality of messages before filtering the plurality of messages using the second message filter bank.

9. The method according to claim 1, further comprising the step of verifying that the second message is related to the first message.

10. The method according to claim 9, wherein the step of verifying that the second message is related to the first message includes determining whether the degree of match between the filtered first message vector and the filtered second message vector corresponding to the determined second message exceeds a threshold value.

11. The method according to claim 1, further comprising the step of presenting a list including the first message, at least one of the plurality of messages, and the degree of match between the filtered first message vector and the filtered second message vector corresponding to the at least one of the plurality of messages.

12. A method of determining from a plurality of messages whether a second message is related to a first message, comprising the steps of:

a. generating a filtered first message vector by filtering the first message using a first message filter bank, said first message filter bank comprising at least one message filter;

b. generating a set of filtered second message vectors by filtering each of the plurality of messages using a second message filter bank, said second message filter bank comprising at least one message filter;

c. determining for each of the set of filtered second message vectors the degree of match between the filtered first message vector and the filtered second message vector; and d. determining for each of the set of filtered second message vectors whether the degree of match between the filtered first message vector and the filtered second message vector exceeds a threshold value.

13. A method of processing a plurality of messages that may be related to a first message, comprising the steps of:

a. generating a filtered first message vector by filtering the first message using a first message filter bank, said first message filter bank comprising at least one message filter;

b. generating a set of filtered second message vectors by filtering each of the plurality of messages using a second message filter bank, said second message filter bank comprising at least one message filter;

c. determining for each of the set of filtered second message vectors the degree of match between the filtered first message vector and the filtered second message vector; and d. presenting a list including the first message, at least one of the plurality of messages, and the degree of match between the filtered first message vector and the filtered second message vector corresponding to the at least one of the plurality of messages.

14. A method of determining a thread of related messages from a plurality of messages, comprising the steps of:

a. generating a filtered first message vector by filtering the first message using a first message filter bank, said first message filter bank comprising at least one message filter;

b. if the first message is contained in the plurality of messages, removing the first message from the plurality of messages;

c. generating a set of filtered second message vectors by filtering each of the plurality of messages using a second message filter bank, said second message filter bank comprising at least one message filter;

d. determining for each of the set of filtered second message vectors the degree of match between the filtered first message vector and the filtered second message vector;

e. determining from each of the degrees of match whether one of the plurality of messages is a second message related to the first message; and f. if it is determined that one of plurality of messages is a second message is related to the first message, substituting the second message in place of the first message and repeating each of the steps a through f herein.

15. The method according to claim 14, wherein the relationship of the second message to the first message is parent to child;

wherein the first message filter bank comprises a message filter that extracts a quoted portion of the message being filtered; and wherein the second message filter bank comprises a message filter that extracts an unquoted portion of the message being filtered.

16. The method according to claim 14, wherein the relationship of the second message to the first message is child to parent;

wherein the first message filter bank comprises a message filter that extracts an unquoted portion of the message being filtered; and wherein the second message filter bank comprises a message filter that extracts a quoted portion of the message being filtered.

17. The method according to claim 14, wherein the step of determining the degree of match between the filtered first message vector and the filtered second message vector comprises use of a statistical information retrieval function.

18. The method according to claim 14, wherein the step of determining from each of the degrees of match which one of the plurality of messages is the second message comprises determining which one of each of the degrees of match is the maximum value and selecting the message corresponding to the determined maximum value.

19. The method according to claim 17, wherein the step of determining the degree of match between the filtered first message vector and the filtered second message vector further comprises combining a set of values resulting from the statistical information retrieval function to form a single value representative of the degree of match.

20. The method according to claim 19, wherein the step of determining from each of the degrees of match which one of the plurality of messages is the second message comprises determining which element of the vector representative of each of the degrees of match is the maximum value, and selecting the message corresponding to the determined maximum value.

21. A method of determining a thread of related messages from a plurality of messages, comprising the steps of:
   a. generating a set of filtered first message vectors by filtering each of the plurality of messages using a first message filter hank, said first message filter bank comprising at least one message filter;
   b. generating a set of filtered second message vectors by filtering each of the plurality of messages using a second message filter bank, said second message filter bank comprising at least one message filter;
   c. determining for each of the set of filtered second message vectors the degree of match between each of the filtered first message vectors and the filtered second message vector;
   d. determining from each of the degrees of match each one of the plurality of messages that is related to another of the plurality of messages; and
   e. determining from each of the plurality of messages that is related to another of the plurality of messages a linked list of messages having successive parent-child relationships.

22. A system for determining from a plurality of messages a second message that is related to a first message, comprising:
   a. a processor; and
   b. memory;
   wherein said processor is programmed to execute the steps of:
      1. generating a filtered first message vector by filtering the first message using a first message filter bank, said first message filter bank comprising at least one message filter;
      2. generating a set of filtered second message vectors by filtering each of the plurality of messages using a second message filter bank, said second message filter bank comprising at least one message filter;
      3. determining for each of the set of filtered second message vectors the degree of match between the filtered first message vector and the filtered second message vector; and
      4. determining from each of the degrees of match which one of the plurality of messages is the second message.

23. The system according to claim 22, wherein the relationship of the second message to the first message is parent to child;
   wherein the first message filter bank comprises a message filter that extracts a quoted portion of the message being filtered; and
   wherein the second message filter bank comprises a message filter that extracts an unquoted portion of the message being filtered.

24. The system according to claim 22, wherein the relationship of the second message to the first message is child to parent;
   wherein the first message filter bank comprises a message filter that extracts an unquoted portion of the message being filtered; and
   wherein the second message filter bank comprises a message filter that extracts a quoted portion of the message being filtered.

25. The system according to claim 22, wherein the step of determining the degree of match between the filtered first message vector and the filtered second message vector comprises use of a statistical information retrieval function.

26. The system according to claim 22, wherein the step of determining from each of the degrees of match which one of the plurality of messages is the second message comprises determining which one of each of the degrees of match is the maximum value and selecting the message corresponding to the determined maximum value.

27. The system according to claim 25, wherein the step of determining the degree of match between the filtered first message vector and the filtered second message vector further comprises combining a set of values resulting from the statistical information retrieval function to form a single value representative of the degree of match.

28. The system according to claim 27, wherein the step of determining from each of the degrees of match which one of the plurality of messages is the second message comprises determining which element of the tuple of values representative of each of the degrees of match is the maximum value, and selecting the message corresponding to the determined maximum value.

29. The system according to claim 22, further comprising the step of if the first message is contained in the plurality of messages, removing the first message from the plurality of messages before filtering the plurality of messages using the second message filter bank.

30. The system according to claim 22, further comprising the step of verifying that the second message is related to the first message.

31. The system according to claim 30, wherein the step of verifying that the second message is related to the first message includes determining whether the degree of match between the filtered first message vector and the filtered second message vector corresponding to the determined second message exceeds a threshold value.

32. The system according to claim 22, further comprising the step of presenting a list including the first message, at least one of the plurality of messages, and the degree of match between the filtered first message vector and the filtered second message vector corresponding to the at least one of the plurality of messages.

33. A system for determining from a plurality of messages whether a second message is related to a first message, comprising the steps of:
   a. generating a filtered first message vector by filtering the first message using a first message filter bank, said first message filter bank comprising at least one message filter;
   b. generating a set of filtered second message vectors by filtering each of the plurality of messages using a second message filter bank, said second message filter bank comprising at least one message filter;
   c. determining for each of the set of filtered second message vectors the degree of match between the filtered first message vector and the filtered second message vector, and
   d. determining for each of the set of filtered second message vectors whether the degree of match between the filtered first message vector and the filtered second message vector exceeds a threshold value.

34. A system for processing a plurality of messages that may be related to a first message, comprising the steps of:

a. generating a filtered first message vector by filtering the first message using a first message filter bank, said first message filter bank comprising at least one message filter;

b. generating a set of filtered second message vectors by filtering each of the plurality of messages using a second message filter bank, said second message filter bank comprising at least one message filter;

c. determining for each of the set of filtered second message vectors the degree of match between the filtered first message vector and the filtered second message vector; and d. presenting a list including the first message, at least one of the plurality of messages, and the degree of match between the filtered first message vector and the filtered second message vector corresponding to the at least one of the plurality of messages.

35. A system for determining a thread of related messages from a plurality of messages, comprising:

a. a processor; and b. memory;

wherein said processor is programmed to execute the steps of:

1. generating a filtered first message vector by filtering the first message using a first message filter bank, said first message filter bank comprising at least one message filter;

2. if the first message is contained in the plurality of messages, removing the first message from the plurality of messages;

3. generating a set of filtered second message vectors by filtering each of the plurality of messages using a second messages filter bank, said second message filter bank comprising at least one message filter;

4. determining for each of the set of filtered second message vectors the degree of match between the filtered first message vector and the filtered second message vector;

5. determining from each of the degrees of match whether one of the plurality of messages is a second message related to the first message; and 6. if it is determined that one of plurality of messages is a second message is related to the first message, substituting the second message in place of the first message and repeating each of the steps a through f herein.

36. The system according to claim 35, wherein the relationship of the second message to the first message is parent to child;

wherein the first message filter bank comprises a message filter that extracts a quoted portion of the message being filtered; and wherein the second message filter bank comprises a message filter that extracts an unquoted portion of the message being filtered.

37. The system according to claim 35, wherein the relationship of the second message to the first message is child to parent;

wherein the first message filter bank comprises a message filter that extracts an unquoted portion of the message being filtered; and wherein the second message filter bank comprises a message filter that extracts a quoted portion of the message being filtered.

38. The system according to claim 35, wherein the step of determining the degree of match between the filtered first message vector and the filtered second message vector comprises use of a statistical information retrieval function.

39. The system according to claim 35, wherein the step of determining from each of the degrees of match which one of the plurality of messages is the second message comprises determining which one of each of the degrees of match is the maximum value and selecting the message corresponding to the determined maximum value.

40. The system according to claim 38, wherein the step of determining the degree of match between the filtered first message vector and the filtered second message vectors further comprises combining a set of values resulting from the statistical information retrieval function to form a single value representative of the degree of match.

41. The system according to claim 40, wherein the step of determining from each of the degrees of match which one of the plurality of messages is the second message comprises determining which element of the vector representative of each of the degrees of match is the maximum value, and selecting the message corresponding to the determined maximum value.

42. A system for determining a thread of related messages from a plurality of messages, comprising the steps of:

a. generating a set of filtered first message vectors by filtering each of the plurality of messages using a first message filter bank, said first message filter bank comprising at least one message filter;

b. generating a set of filtered second message vectors by filtering each of the plurality of messages using a second message filter bank, said second message filter bank comprising at least one message filter;

c. determining for each of the set of filtered second message vectors the degree of match between each of the filtered first message vectors and the filtered second message vector;

d. determining from each of the degrees of match each one of the plurality of messages that is related to another of the plurality of messages; and e. determining from each of the plurality of messages that is related to another of the plurality of messages a linked list of messages having successive parent-child relationships.

43. An article of manufacture, comprising a computer-readable medium having stored thereon instructions for determining from a plurality of messages a second message that is related to a first message, said instructions which, when performed by a processor, cause the processor to execute the steps comprising the steps of:

a. generating a filtered first message vector by filtering the first message using a first message filter bank, said first message filter bank comprising at least one message filter;

b. generating a set of filtered second message vectors by filtering each of the plurality of messages using a second messages filter bank, said second message filter bank comprising at least one message filter;

c. determining for each of the set of filtered second message vectors the degree of match between the filtered first message vector and the filtered second message vector; and d. determining from each of the degrees of match which one of the plurality of messages is the second message.

44. The article of manufacture according to claim 43, wherein the relationship of the second message to the first message is parent to child;

wherein the first message filter bank comprises a message filter that extracts a quoted portion of the message being filtered; and wherein the second message filter bank comprises a message filter that extracts an unquoted portion of the message being filtered.

45. The article of manufacture according to claim 43, wherein the relationship of the second message to the first message is child to parent;

wherein the first message filter bank comprises a message filter that extracts an unquoted portion of the message being filtered; and wherein the second message filter bank comprises a message filter that extracts a quoted portion of the message being filtered.

46. The article of manufacture according to claim 43, wherein the step of determining the degree of match between the filtered first message vector and the filtered second message vector comprises use of a statistical information retrieval function.

47. The article of manufacture according to claim 43, wherein the step of determining from each of the degrees of match which one of the plurality of messages is the second message comprises determining which one of each of the degrees of match is the maximum value and selecting the message corresponding to the determined maximum value.

48. The article of manufacture according to claim 46, wherein the step of determining the degree of match between the filtered first message vector and the filtered second message vector further comprises combining a set of values resulting from the statistical information retrieval function to form a single value representative of the degree of match.

49. The article of manufacture according to claim 48, wherein the step of determining from each of the degrees of match which one of the plurality of messages is the second message comprises determining which element of the tuple of values representative of each of the degrees of match is the maximum value, and selecting the message corresponding to the determined maximum value.

50. The article of manufacture according to claim 43, further comprising the step of if the first message is contained in the plurality of messages, removing the first message from the plurality of messages before filtering the plurality of messages using the second message filter bank.

51. The article of manufacture according to claim 43, further comprising the step of verifying that the second message is related to the first message.

52. The article of manufacture according to claim 51, wherein the step of verifying that the second message is related to the first message includes determining whether the degree of match between the filtered first message vector and the filtered second message vector corresponding to the determined second message exceeds a threshold value.

53. The article of manufacture according to claim 43, further comprising the step of presenting a list including the first message, at least one of the plurality of messages, and the degree of match between the filtered first message vector and the filtered second message vector corresponding to the at least one of the plurality of messages.

54. An article of manufacture comprising a computer-readable medium having stored thereon instructions for determining from a plurality of messages whether a second message is related to a first message, said instructions which, when performed by a processor, cause the processor to execute the steps comprising the steps of:

a. generating a filtered first message vector by filtering the first message using a first message filter bank, said first message filter bank comprising at least one message filter;

b. generating a set of filtered second message vectors by filtering each of the plurality of messages using a second message filter bank, said second message filter bank comprising at least one message filter;

c. determining for each of the set of filtered second message vectors the degree of match between the filtered first message vector and the filtered second message vector; and d. determining for each of the set of filtered second message vectors whether the degree of match between the filtered first message vector and the filtered second message vector exceeds a threshold value.

55. An article of manufacture comprising a computer-readable medium having stored thereon instructions for processing a plurality of messages that may be related to a first message, said instructions which, when performed by a processor, cause the processor to execute the steps comprising the steps of:

a. generating a filtered first message vector by filtering the first message using a first message filter bank, said first messages filter bank comprising at least one message filter;

b. generating a set of filtered second message vectors by filtering each of the plurality of messages using a second messages filter bank, said second message filter bank comprising at least one message filter;

c. determining for each of the set of filtered second message vectors the degree of match between the filtered first message vector and the filtered second message vector; and d. presenting a list including the first message, at least one of the plurality of messages, and the degree of match between the filtered first message vector and the filtered second message vector corresponding to the at least one of the plurality of messages.

56. An article of manufacture, comprising a computer-readable medium having stored thereon instructions for determining a thread of related messages from a plurality of messages, said instructions which, when performed by a processor, cause the processor to execute the steps comprising the steps of:

a. generating a filtered first message vector by filtering the first message using a first message filter bank, said first message filter bank comprising at least one message filter;

b. if the first message is contained in the plurality of messages, removing the first message from the plurality of messages;

c. generating a set of filtered second message vectors by filtering each of the plurality of messages using a second message filter bank, said second message filter bank comprising at least one message filter;

d. determining for each of the set of filtered second message vectors the degree of match between the filtered first message vector and the filtered second message vector;

e. determining from each of the degrees of match whether one of the plurality of messages is a second message related to the first message; and f. if it is determined that one of plurality of messages is a second message is related to the first message, substituting the second message in place of the first message and repeating each of the steps a through f herein.

57. The article of manufacture according to claim 56, wherein the relationship of the second message to the first message is parent to child;

wherein the first message filter bank comprises a message filter that extracts a quoted portion of the message being filtered; and wherein the second message filter bank comprises a message filter that extracts an unquoted portion of the message being filtered.

58. The article of manufacture according to claim 56, wherein the relationship of the second message to the first message is child to parent;

wherein the first message filter bank comprises a message filter that extracts an unquoted portion of the message being filtered; and wherein the second message filter bank comprises a message filter that extracts a quoted portion of the message being filtered.

59. The article of manufacture according to claim 56, wherein the step of determining the degree of match between the filtered first message vector and the filtered second message vector comprises use of a statistical information retrieval function.

60. The article of manufacture according to claim 56, wherein the step of determining from each of the degrees of match which one of the plurality of messages is the second message comprises determining which one of each of the degrees of match is the maximum value and selecting the message corresponding to the determined maximum value.

61. The article of manufacture according to claim 59, wherein the step of determining the degree of match between the filtered first message vector and the filtered second message vector further comprises combining a set of values resulting from the statistical information retrieval function to form a single value representative of the degree of match.

62. The article of manufacture according to claim 61, wherein the step of determining from each of the degrees of match which one of the plurality of messages is the second message comprises determining which element of the vector representative of each of the degrees of match is the maximum value, and selecting the message corresponding to the determined maximum value.

63. An article of manufacture comprising a computer-readable medium having stored thereon instructions for determining a thread of related messages from a plurality of messages, said instructions which, when performed by a processor, cause the processor to execute the steps comprising the steps of:

a. generating a set of filtered first message vectors by filtering each of the plurality of messages using a first message filter bank, said first message filter bank comprising at least one message filter;

b. generating a set of filtered second message vectors by filtering each of the plurality of messages using a second message filter bank, said second message filter bank comprising at least one message filter;

c. determining for each of the set of filtered second message vectors the degree of match between each of the filtered first message vectors and the filtered second message vector;

d. determining from each of the degrees of match each one of the plurality of messages that is related to another of the plurality of messages; and e. determining from each of the plurality of messages that is related to another of the plurality of messages a linked list of messages having successive parent-child relationships.

* * * * *